(12) United States Patent
Koyomogi et al.

(10) Patent No.: US 9,471,065 B2
(45) Date of Patent: Oct. 18, 2016

(54) INTEGRATED TYPE GAS SUPPLYING APPARATUS

(71) Applicant: FUJIKIN INCORPORATED, Osaka (JP)

(72) Inventors: Mutsunori Koyomogi, Osaka (JP); Takashi Hirose, Osaka (JP); Michio Yamaji, Osaka (JP); Takahiro Matsuda, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 14/425,790

(22) PCT Filed: Oct. 18, 2013

(86) PCT No.: PCT/JP2013/006184
§ 371 (c)(1),
(2) Date: Mar. 4, 2015

(87) PCT Pub. No.: WO2014/068886
PCT Pub. Date: May 8, 2014

(65) Prior Publication Data
US 2015/0234390 A1    Aug. 20, 2015

(30) Foreign Application Priority Data

Nov. 2, 2012 (JP) ................................. 2012-243041

(51) Int. Cl.
*F16K 11/22* (2006.01)
*F16K 11/24* (2006.01)
(Continued)

(52) U.S. Cl.
CPC ............. *G05D 7/00* (2013.01); *F15B 13/044* (2013.01); *G05D 7/0682* (2013.01); *Y10T 137/87249* (2015.04); *Y10T 137/87885* (2015.04)

(58) Field of Classification Search
CPC ............. Y10T 137/87249; Y10T 137/87885; G05D 11/132
See application file for complete search history.

(56) References Cited

U.S. PATENT DOCUMENTS 5,996,394 A * 12/1999 Peinecke ................. B01F 3/026
73/1.03
6,068,016 A * 5/2000 Manofsky, Jr. ...... C23C 16/4408
137/269

(Continued)

FOREIGN PATENT DOCUMENTS

JP    05-172265 A    7/1993
JP    08-312900 A    11/1996

(Continued)

OTHER PUBLICATIONS

International Search Report issued in corresponding application PCT/JP2013/006184, completed Nov. 1, 2013 and mailed Nov. 12, 2013.

*Primary Examiner* — Marina Tietjen
*Assistant Examiner* — Seth W Mackay-Smith
(74) *Attorney, Agent, or Firm* — Griffin and Szipl PC

(57) ABSTRACT

A plurality of stacked and fixed gas supplying units U, each gas supplying unit U having at least four gas supply lines S is formed by opposingly combining and fixing two flow controllers 3, each flow controller 3 provided with a plurality of flow control units, to a gas inlet-side block 12 and a gas outlet-side block 13 that are disposed in parallel across an interval in plan view and providing each flow controller 3 with an inlet opening and closing valve 1 and an outlet opening and closing valve 5.

30 Claims, 15 Drawing Sheets

(51) Int. Cl.
*F15B 13/044* (2006.01)
*G05D 7/00* (2006.01)
*G05D 7/06* (2006.01)

(56) References Cited

U.S. PATENT DOCUMENTS

| | | | | |
|---|---|---|---|---|
| 6,158,454 A * | 12/2000 | Duret | ...................... | B08B 15/00 |
| | | | | 118/715 |
| 6,231,260 B1 * | 5/2001 | Markulec | .............. | F16K 27/003 |
| | | | | 137/884 |
| 6,260,581 B1 * | 7/2001 | Hollingshead | ........ | F16K 27/003 |
| | | | | 137/271 |
| 6,293,310 B1 * | 9/2001 | Redemann | ............... | C23C 16/44 |
| | | | | 137/269 |
| 6,349,744 B1 * | 2/2002 | Grosshart | ............... | C23C 16/44 |
| | | | | 137/269 |
| 6,648,020 B2 * | 11/2003 | Fujimoto | .............. | F16K 27/003 |
| | | | | 137/343 |
| 8,196,609 B2 * | 6/2012 | Oya | ...................... | C23C 16/455 |
| | | | | 137/884 |
| 8,291,935 B1 * | 10/2012 | Merritt | .................. | F16K 27/003 |
| | | | | 137/597 |
| 8,770,214 B2 * | 7/2014 | Uchida | ................ | G05D 11/132 |
| | | | | 118/715 |
| 2009/0320754 A1 * | 12/2009 | Oya | ...................... | C23C 16/455 |
| | | | | 118/715 |
| 2012/0227848 A1 | 9/2012 | Oya et al. | | |

FOREIGN PATENT DOCUMENTS

| | | |
|---|---|---|
| JP | 10-184966 A | 7/1998 |
| JP | 11-353030 A | 12/1999 |
| JP | 2002-349797 A | 12/2002 |
| JP | 2004-100889 A | 4/2004 |
| JP | 2006-234110 A | 9/2006 |
| JP | 2006-330851 A | 12/2006 |
| JP | 2008-249002 A | 10/2008 |
| JP | 2008-298180 A | 12/2008 |
| WO | 2008/023711 A1 | 2/2008 |
| WO | 2013/046660 A1 | 4/2013 |

* cited by examiner

Prior Art

INTEGRATED TYPE GAS SUPPLYING APPARATUS

The present application is a national phase entry in the USA of PCT/JP2013/006184, filed Oct. 18, 2013, which claims priority on Japanese Patent Application No. 2012-243041, filed Nov. 2, 2012. The entire disclosures of the above applications are incorporated herein by reference.

FIELD OF THE INVENTION

The present invention relates to an improvement in an integrated type gas supplying apparatus, and relates to an integrated type gas supplying apparatus that enables a significant increase in the number of gas supply lines, downsizing of the integrated type gas supplying apparatus, facilitation of maintenance and inspection, and improvement in gas replaceability, etc.

BACKGROUND OF THE INVENTION

Conventionally, a so-called integrated type gas supplying apparatus is used to supply process gas to semiconductor manufacturing equipment, etc.

FIG. 15 shows one example thereof, in which two-way opening and closing valves 41A and 41B, three-way opening and closing valves 42A and 42B, a flow control device 43, etc., are integrated in series via block bodies 44, 45, 46, 47, and 48, each having a gas flow passage, to form one gas supply line, and a plurality of such gas supply lines are disposed and fixed in parallel via block bodies 45 and 49 to constitute an integrated type gas supplying apparatus (Japanese Published Unexamined Patent Application No. Hei 5-172265, etc.).

This type of integrated type gas supplying apparatus provides an excellent effect in that fixing bolts for fixing the respective devices to the block bodies can be removed from the upper side of the apparatus to enable easy replacement of the control devices forming the respective gas supply lines, as well as easy accommodation of addition of gas supply lines, etc.

However, an increase in the number of required gas supply lines inevitably results in an increase in the depth dimension L of the integrated type gas supplying apparatus due to a thermal type flow control device (mass flow controller) or a pressure type flow control device being approximately 20 mm to 24 mm in thickness $L_0$, and this poses a problem of an increase in dimensions of the integrated type gas supplying apparatus.

Also, recently with semiconductor manufacturing equipment, multiple chamber arrangements, provided with a plurality of processing chambers to process a plurality of wafers simultaneously, and chamber multiple process arrangements, with which a plurality of processes are performed continuously in a single processing chamber, are being adopted, giving rise to a need for an integrated type gas supplying apparatus to be provided with multiple gas supply lines to accommodate the increase in the types of supply gases. For example, an integrated type gas supplying apparatus used in semiconductor manufacturing equipment with a 1-chamber multiple process arrangement may be required to have 16 gas supply lines.

However, as the number of gas supply lines increases, the semiconductor manufacturing equipment inevitably becomes large, leading to problems related to an increase in installation space and an increase in the volume of an expensive clean room.

Furthermore, an integrated type gas supplying apparatus is required to switch instantaneously among the various types of process gases to be supplied to a process chamber and supply a specific gas at a predetermined flow rate in a clean state. It is thus essential to reduce the gas flow passage volume in the interior of the integrated type gas supplying apparatus as much as possible, in order to improve the gas replaceability; and to make arrangements to enable easy maintenance and management of the apparatus, in particular, easy replacement and adjustment of the various devices and prevent leakage from connection portions.

However, in actuality, it is difficult to reduce the gas flow passage volume in the interior of the integrated type gas supplying apparatus and, for example, with an integrated type gas supplying apparatus having 16 supply lines, a rated gas flow rate of 1.0 SLM, and a gas flow passage inner diameter of 6.27 mm (¼ inch), it is difficult to reduce the gas flow passage volume in the interior to no more than 120 cc to 150 cc, and, consequently, switching among gas types cannot be performed swiftly, but requires an average time of approximately 5 seconds, thereby giving rise to various problems in terms of productivity and product quality of the semiconductor manufacturing equipment.

CITATION LIST

Patent Documents

Patent Document 1: Japanese Published Unexamined Patent Application No. Hei 5-172265
Patent Document 2: Japanese Published Unexamined Patent Application No. 2008-298180
Patent Document 3: Japanese Published Unexamined Patent Application No. 2002-349797
Patent Document 4: Japanese Published Unexamined Patent Application No. 2004-100889
Patent Document 5: Japanese Published Unexamined Patent Application No. 2006-330851

SUMMARY OF THE INVENTION

An object of the invention of the present application is to solve the above-described problems in this type of conventional integrated type gas supplying apparatus, that is, whereas A) the conventional apparatus, having the structure in which various devices, such as an inlet opening and closing valve, a three-way opening and closing valve for purging, a flow controller, an outlet opening and closing valve, etc., are coupled in a line (in series) to form a gas supply line S and a plurality of such gas supply lines are disposed and fixed in parallel on a base plate, has such problems as it being difficult to downsize the apparatus and therefore not possible to accommodate the needs to increase the number of gas supply lines, reduce the installation space, etc.; and whereas B) it is difficult to reduce the fluid passage volume in the interior of the integrated type gas supplying apparatus to improve the gas replaceability, etc.; the present invention is intended to solve these problems by providing:

with improvements in the structure of the flow controller itself and the combination structure of the plurality of flow supply lines, an integrated type gas supplying apparatus that enables, for example, the outer dimensions of an integrated type gas supplying apparatus with 16 gas supply lines to be made no more than 240 mm in width W, no more than 270 mm in depth L, and no more than 240 mm in height H and the gas passage volume in the interior of the gas supplying apparatus to be reduced significantly to achieve a reduction in clean room volume and a significant improvement in the gas replaceability and yet enables maintenance and inspection to be performed easily even upon installation at a roof portion of semiconductor manufacturing equipment, etc., and also enables highly precise flow rate control, stable supply of clean gas, etc.

In a basic arrangement of the invention of the present application, a gas supplying unit U having at least four gas supply lines S is formed by opposingly combining and fixing two flow controllers 3, each flow controller 3 provided with a plurality of flow control units, to a gas inlet-side block 12 and a gas outlet-side block 13 that are disposed in parallel across an interval in plan view and providing each flow controller 3 with an inlet opening and closing valve 1 and an outlet opening and closing valve 5, and a plurality of such gas supplying units U are stacked and fixed.

Preferably, each flow controller 3 is a pressure type flow controller 3 having two flow control units disposed in parallel, the respective flow controllers 3 are opposingly combined and fixed by fixing an inlet block 15 of each flow controller 3 to a side surface of the gas inlet-side block 12 and fixing an outlet block 16 of each flow controller 3 to a side surface of the gas outlet-side block 13. Furthermore, the inlet opening and closing valve 1 is fixed to a right side of the gas inlet-side block 12, the outlet opening and closing valve 5 is fixed to a left side of the gas outlet-side block 13, and the number of gas supplying units U stacked is set to a plurality, for example, four to make the total number of gas supply lines S equal to the number of units×4, for example, 16. For example, with an arrangement where the number of stacked units is 4, the integrated type gas supplying apparatus having the total of 16 gas supply lines S can be formed extremely compactly.

Also preferably, an inlet opening and closing valve main body block 18 is attached and fixed to a right side surface of the gas inlet-side block 12, the inlet opening and closing valves 1 of the respective flow controllers 3 are attached and fixed to a front surface side and a back surface side of the inlet opening and closing valve main body block 18, an outlet opening and closing valve main body block 19 is attached and fixed to a left side surface of the gas outlet-side block 13, and the outlet opening and closing valves 5 of the respective flow controllers 3 are attached and fixed to a front surface side and a back surface side of the outlet opening and closing valve main body block 19. By providing such an attachment structure, further downsizing of the integrated type gas supplying apparatus is made possible.

Furthermore, for each flow controller 3, one inlet opening and closing valve 1 may be disposed at the inlet opening and closing valve main body block 18, a process gas or a purge gas from a single process gas inlet joint 6 or a purge gas inlet joint 7 may be supplied to the inlet opening and closing valves 1 of both flow controllers 3, and the process gas or the purge gas may be supplied to the respective flow controllers 3 through gas passages 28 of the gas inlet-side block 12 and gas passages 28 of the pressure type flow controller inlet blocks 15. With such an arrangement, the process gas is supplied to the respective gas supplying units U from the process gas inlet joints 6 at four locations, thereby facilitating operational management of the apparatus.

Also, for each flow controller 3, two outlet opening and closing valves 5 may be disposed at the outlet opening and closing valve main body block 19 and the process gas or purge gas from the total of four outlet opening and closing valves 5 may be supplied through a single process gas outlet joint 8. With this arrangement, from each of a plurality, for example, four gas supplying units U the process gas is merged and supplied through the process gas outlet joint 8 as shown in FIG. 1.

The gas inlet-side block 12 may be arranged as a column-shaped body of height H with a plurality of, for example, four gas passages (penetrating holes) 25 bored therein in a vertical direction, and inlet-side gas passage portions having four gas passages 28 in the gas inlet-side block 12 that respectively correspond to the plurality of, for example, four stacked gas supplying units U, may be formed to put in mutual communications by the vertical direction gas passages 25. By this arrangement, the gas distribution passage volume in the interior of the integrated type gas supplying apparatus can be reduced further and the gas inlet-side block 12 can be utilized as a supporting fixing member for the opposing flow controller 3, etc.

Also in this case, the process gas flowing in from each process gas inlet joint 6 is introduced respectively and uniformly into the plurality of, for example, four gas supplying units U, as shown in FIG. 1.

Also preferably, the gas outlet-side block 13 is arranged as a column-shaped body of height H with outlet-side gas passage portions having four gas passages 28 of the plurality of, for example, four stacked gas supplying units U formed therein at intervals in the height direction. By this arrangement, the fixing of the respective opposing devices, such as the flow controllers 3, etc., is made easier. Also as shown in FIG. 1, the gas from the four gas supply lines S of each gas supplying unit U is merged and supplied through the process gas outlet joint 8.

The gas inlet-side block 12 may be arranged as a column-shaped body of height H and inlet-side gas passage portions having four gas passages 28 that supply the process gas or the purge gas to the plurality of, for example, four stacked gas supplying units U may be formed therein at intervals in the height direction. In this case, the process gas flowing in from each process gas inlet joint 6 is introduced respectively and uniformly into four flow controllers 3 of a single gas supplying unit U as shown in FIG. 8.

The outlet opening and closing valve main body block 19 may be provided with an outlet-side gas passage portion having four independent gas passages 28 respectively in communication with four outlet opening and closing valves 5, each of the gas passages 28 may be provided with the process gas outlet joint 8, and the respective process gas outlet joints 8 of the plurality of, for example, four stacked gas supplying units U may be coupled to each other by a coupling pipe 29. With this arrangement, single gas supply line S from the respective gas supplying units U are merged to supply through the process gas outlet joint 8 as shown in FIG. 8.

Also, the outlet opening and closing valve main body block 19 may be arranged as a column-shaped body of height H with a plurality of, for example, four vertical direction gas passages (penetrating holes) 25 bored therein in the vertical direction, outlet-side gas passage portions having four independent gas passages 28 of the plurality of, for example, four stacked gas supplying units U may be formed at intervals in the height direction in the outlet opening and closing valve main body block 19, and the gas passages 28 of the respective outlet-side gas passage portions of the plurality of, for example, four stacked gas supplying units U may be coupled to each other by the vertical direction gas passages (penetrating holes) 25. By this arrangement, the coupling pipe 29 is made unnecessary and the apparatus can be simplified more.

Furthermore, an inlet opening and closing valve main body block 18a may be interposed between the gas inlet-side block 12 and the inlet opening and closing valve main body block 18 and an inlet opening and closing valve 1a and a process gas inlet joint 6a may be fixed to a back surface side and a front surface side of the inlet opening and closing valve main body block 18a to increase the number of locations for supplying the process gas. By this arrangement, an increase in the number of locations for supplying the process gas, etc., can be achieved more simply.

EFFECT(S) OF THE INVENTION

In the arrangement of the invention of the present application, the gas supplying unit U having at least four gas supply lines S is formed by opposingly combining and fixing the two flow controllers 3, each provided with the plurality of flow control units, to the gas inlet-side block 12 and the gas outlet-side block 13 that are disposed in parallel across the interval in plan view and providing each flow controller 3 with the inlet opening and closing valve 1 and the outlet opening and closing valve 5, and the plurality of such gas supplying units U are stacked and fixed.

Consequently, even when the gas supply lines S are increased, the integrated type gas supplying apparatus is not enlarged significantly, and, for example, in a case where four gas supplying units U are stacked, the number of gas supply lines S is 16, and the control flow rate of each line is 1 LM, the dimensions of the integrated type gas supplying apparatus can be downsized significantly to be within 240 mm in height, 240 mm in width, and 450 mm in depth.

Also, with the above arrangement, the gas distribution passage volume of the interior of the integrated type gas supplying apparatus can be reduced significantly, and, especially with the arrangement where the two flow controllers 3, each provided with the plurality of flow control units, are opposingly combined and fixed to the gas inlet-side block 12 and the gas outlet-side block 13 that are disposed in parallel across the interval and each flow controller 3 is provided with the inlet opening and closing valve 1 and the outlet opening and closing valve 5, an integrated type gas supplying apparatus, with which the inner diameter of the gas distribution passage is 6.27 mm, the number of gas supply lines is 16, and the control flow rate of each line is 1 LM, can be made to have an internal gas passage volume of approximately 60 cc to 70 cc, thus achieving a reduction to substantially no more than ⅓ the internal gas passage volume of the conventional integrated type gas supplying apparatus.

Consequently, the so-called gas replaceability is significantly improved and the time required for gas replacement is shortened by approximately 30% to 40%, in comparison to a conventional integrated type gas supplying apparatus with the same control volume.

Furthermore, the integrated type gas supplying apparatus according to the present invention is compact and lightweight, and can therefore be installed easily, even on a roof surface of semiconductor manufacturing equipment, to enable downsizing of the cleanroom footprint, and all devices constituting the integrated type gas supplying apparatus can be removed or attached from sides of the apparatus to make maintenance and management of the apparatus extremely easy.

The invention will now be described with reference to certain non-limiting embodiments of the present invention and with reference to the attached figures of drawings in which like parts are referred to with like reference numerals

DETAILED DESCRIPTION OF THE PREFERRED EMBODIMENTS

Hereinafter, a description will be given of individual preferred embodiments of the present invention with reference to drawings.

Embodiment 1

Figure 1:
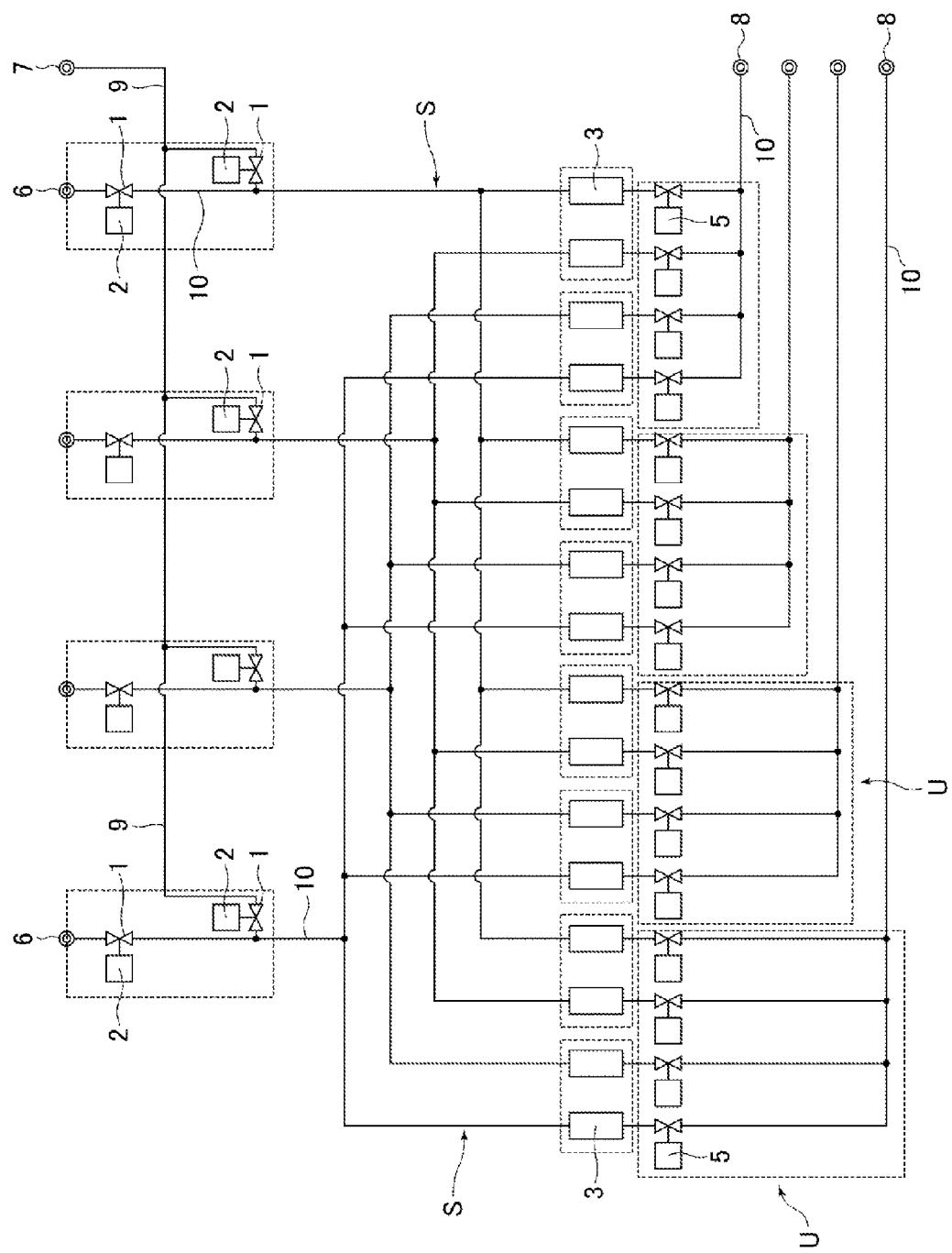
FIG. 1 is a gas supplying system diagram of an integrated type gas supplying apparatus for semiconductor manufacturing equipment according to Embodiment 1 of the present invention.

FIG. 1 to FIG. 7 show an integrated type gas supplying apparatus for semiconductor manufacturing equipment according to Embodiment 1 of the present invention, and as shown in the gas supplying system diagram of FIG. 1, in Embodiment 1, four types of gases supplied to process gas inlet joints 6 pass through 16 gas supply lines S and any one of four process gas passages 10 to be supplied to a process treatment device (not illustrated) from a process gas outlet joint 8.

That is, the present embodiment has an arrangement wherein the total of 16 gas supply lines S are grouped into four groups, gases flowing in from the respective process gas inlet joints 6 are introduced into the four groups respectively, and four gas supply lines S drawn out from each of the four groups are merged into one to perform supplying to the process treatment device (not illustrated) from the process gas passages 10, respectively.

In FIG. 1, reference symbol 1 denotes an inlet opening and closing valve, 2 denotes a valve driving unit, 3 denotes a flow controller, 5 denotes an outlet opening and closing valve, 6 denotes the process gas inlet joint, 7 denotes a purge gas inlet joint, 8 denotes the process gas outlet joint, 9 denotes a purge gas passage, and 10 denotes the process gas passage.

In the following description, each group arranged from four gas supply lines S described above shall be referred to as a "gas supplying unit U."

Figure 2:
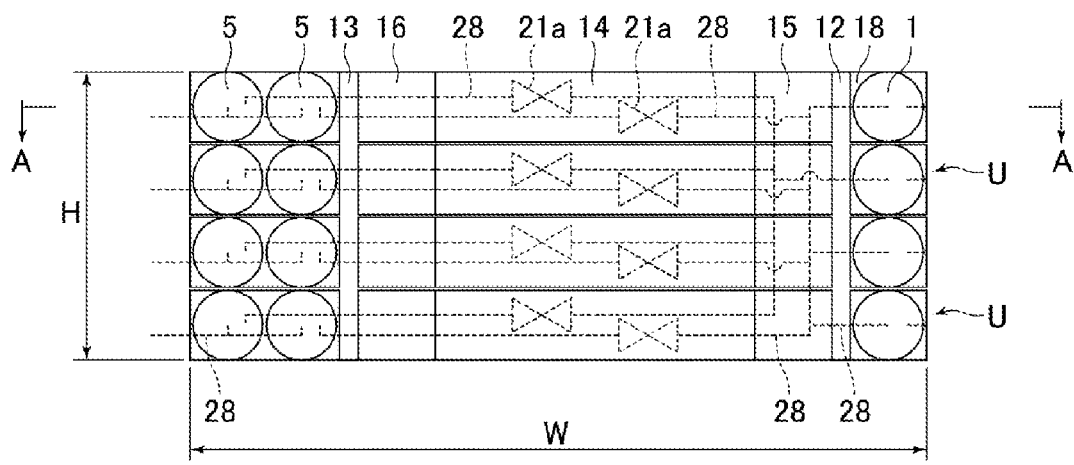
FIG. 2 is a front elevational view of the integrated type gas supplying apparatus for semiconductor manufacturing equipment according to Embodiment 1 of the present invention.

FIG. 2 is a front elevational view of the integrated type gas supplying apparatus for semiconductor manufacturing equipment according to Embodiment 1 of the present invention, and this integrated type gas supplying apparatus is formed by stacking the four gas supplying units U, each arranged from four gas supply lines S, in a vertical direction and fixing the units to each other, and the integrated type gas supplying apparatus has dimensions of a height H of 85 mm to 90 mm, a width W of 202 mm to 210 mm, and a depth L of 420 mm to 424 mm.

Also in the following description, the outlet opening and closing valve 5 side in FIG. 2 shall hereinafter be referred to as a "left side surface," the inlet opening and closing valve 1 side shall be referred to as a "right side surface," a back side opposite a front surface shall be referred to as a "back surface (inner portion of depth L)," the lower side of the height H shall be referred to as a "bottom surface," and the upper side shall be referred to as an "upper surface."

Figure 3:
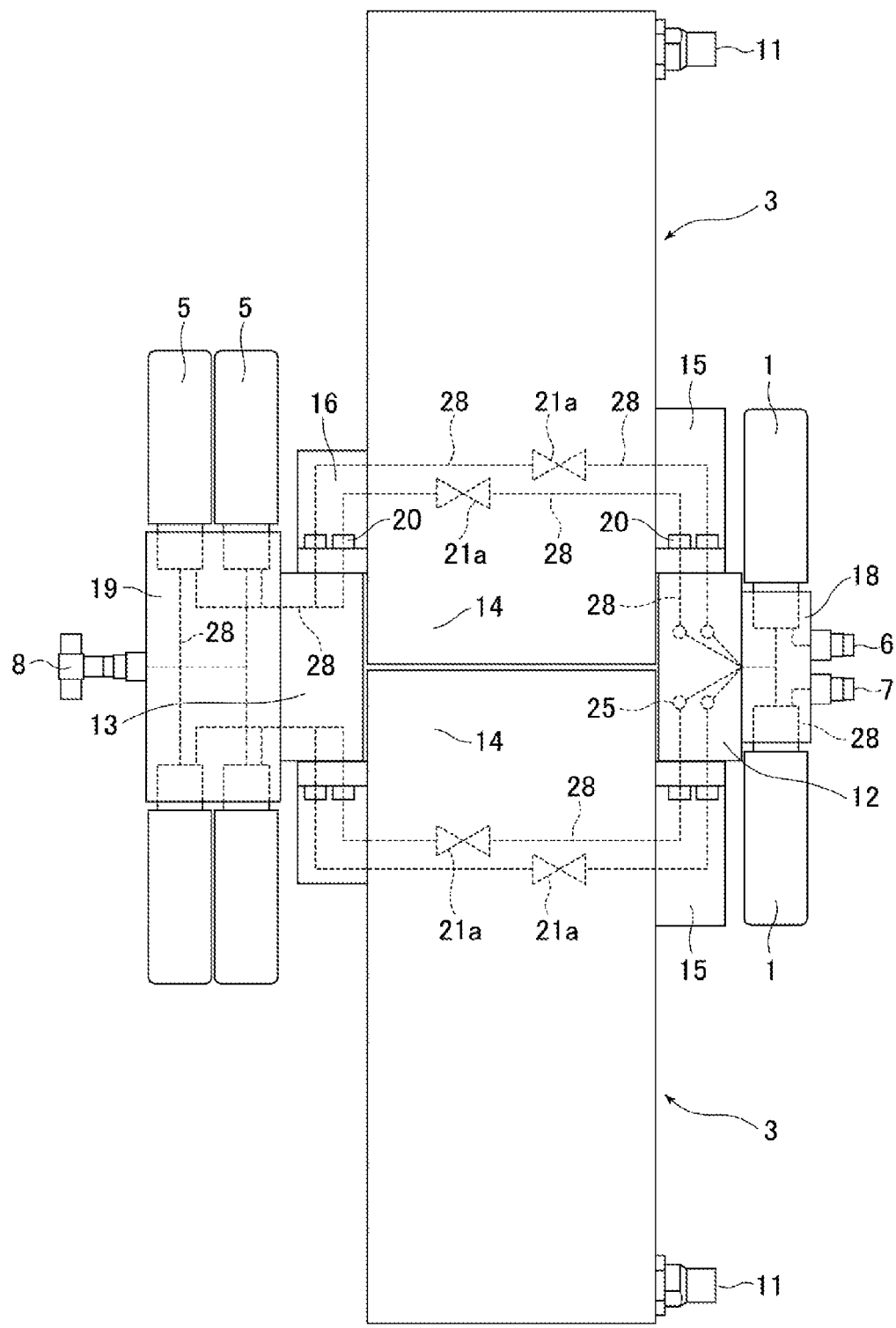
FIG. 3 is a transverse sectional schematic drawing (cross sectional schematic drawing taken along a line A to A in FIG. 2) of a gas supplying unit used in Embodiment 1 of the present invention.

FIG. 3 is a cross sectional schematic drawing taken along a line A to A in FIG. 2 and corresponds to a transverse sectional schematic drawing of each gas supplying unit U. As shall be described in detail later, the gas supplying unit U is formed by disposing a gas inlet-side block 12 and a gas outlet-side block 13 vertically and in parallel across an interval in plan view, fixing an inlet opening and closing valve main body block 18 to the gas inlet-side block 12 and an outlet opening and closing valve main body block 19 to the gas outlet-side block 13, and fixing inlet opening and closing valves 1, flow controllers 3, outlet opening and closing valves 5, etc., respectively opposingly to front surface sides and back surface sides of these members.

That is, each flow controller 3 is fixed to the gas inlet-side block 12 and the gas outlet-side block 13 via a pressure type flow controller inlet block 15 and a pressure type flow controller outlet block 16, and a single gas supplying unit U having four gas supply lines S is formed by making a first unit body $U_1$ and a second unit body $U_2$, each having two gas supply lines S that include the inlet opening and closing valve 1, the flow controller 3, the outlet opening and closing valves 5, etc., oppose each other horizontally and fixing these to front surface sides and back surface sides of the gas inlet-side block 12 and the gas outlet-side block 13.

Figure 11:
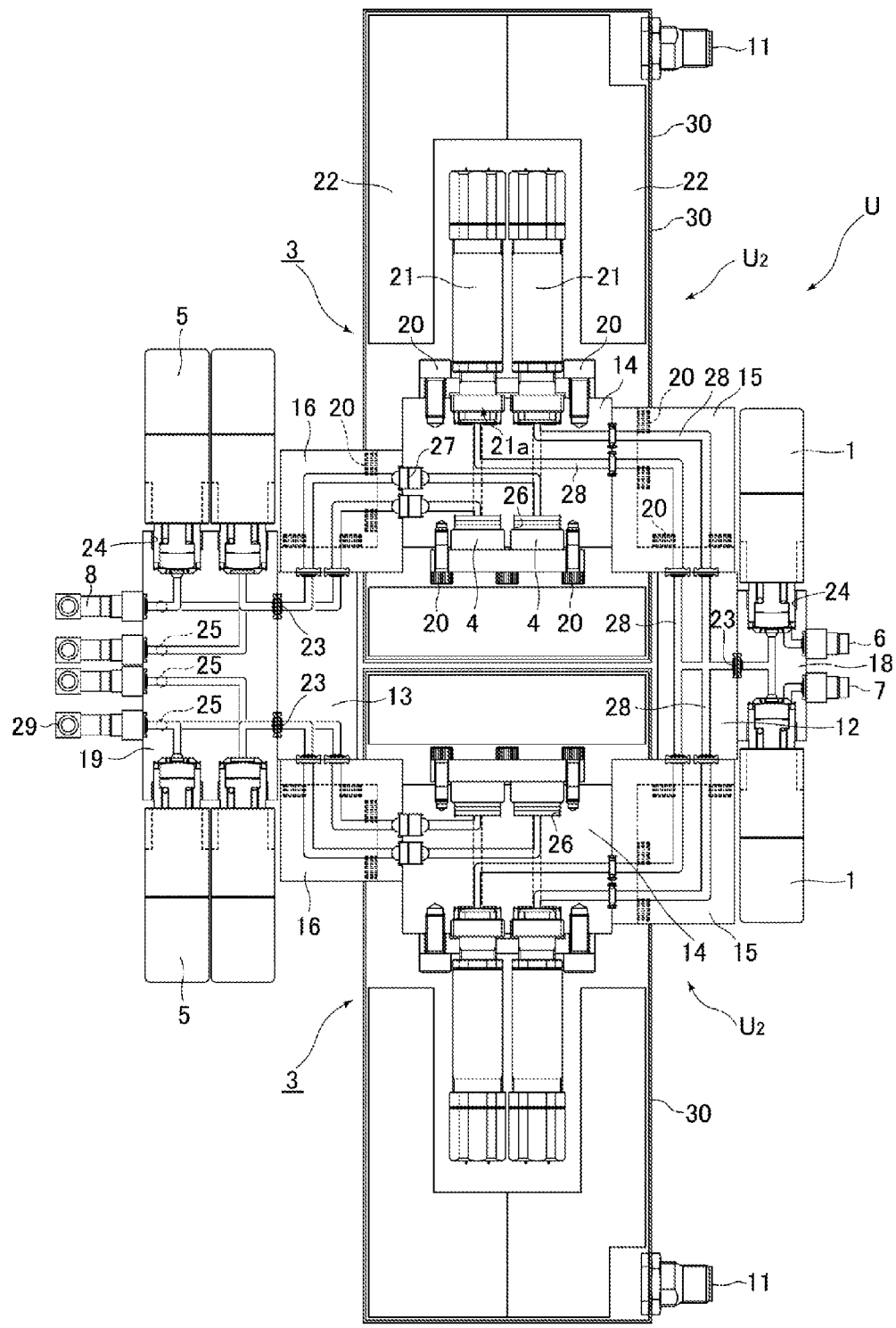
FIG. 11 is an enlarged cross sectional schematic drawing taken along the line B to B in FIG. 9.
Figure 12:
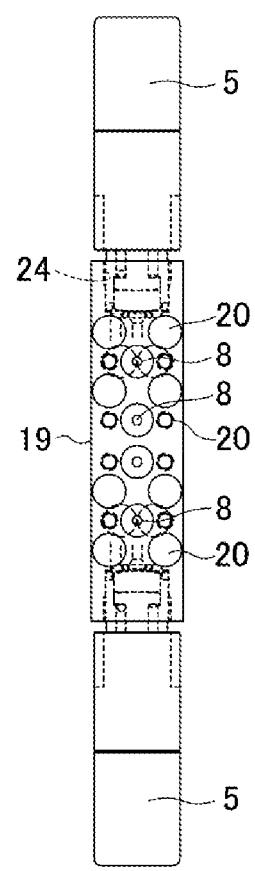
FIG. 12 is a left side view of a gas outlet portion in FIG. 11.

In FIG. 2 and FIG. 3, 11 denotes an input/output connecting tool, 14 denotes a flow controller main body block, 20 denotes a fixing bolt, 21*a* denotes a control valve of the flow controller, and 28 denotes a gas passage.

Example 1

Figure 4:
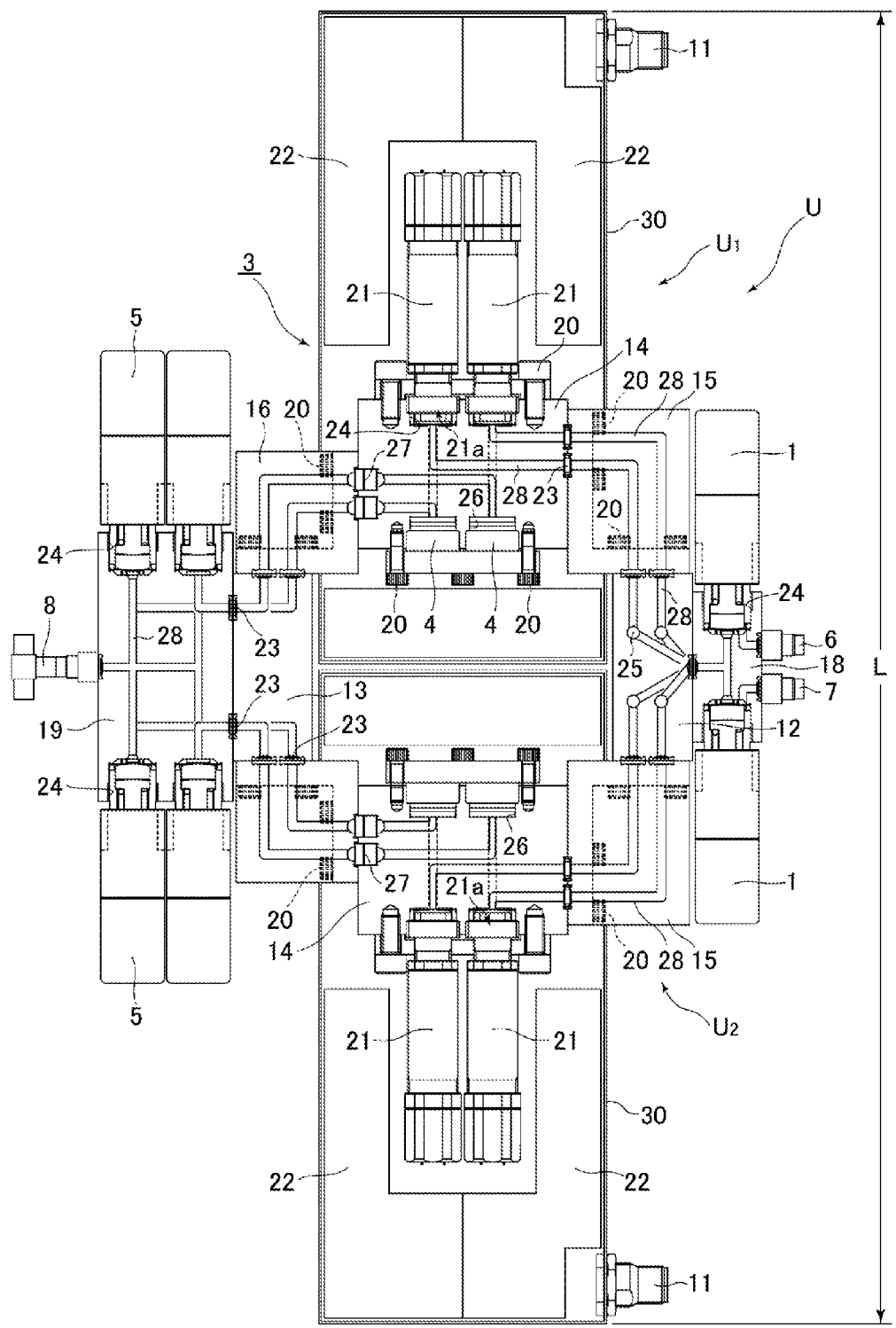
FIG. 4 is an enlarged cross sectional schematic drawing taken along the line A to A in FIG. 2.
Figure 5:
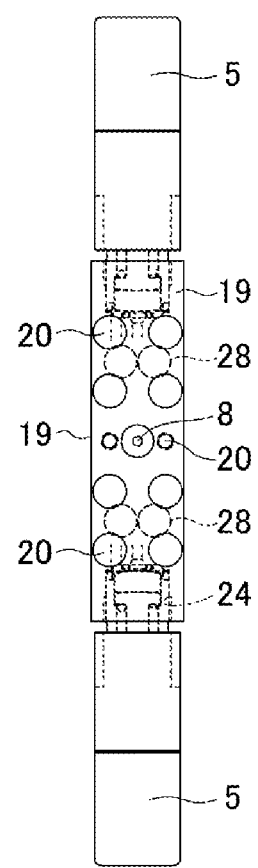
FIG. 5 is a left side view of a gas outlet portion in FIG. 4.

FIG. 4 shows the arrangement of the gas supplying unit U used in Embodiment 1, and the gas supplying unit U according to Example 1 is formed by making the first unit body $U_1$ and the second unit body $U_2$ of the same arrangement oppose each other horizontally and assembling these to the front surface sides and back surface sides of the gas inlet-side block 12 and the gas outlet-side block 13 disposed in parallel at regular intervals in the vertical direction.

That is, the first unit body $U_1$ is formed from the rectangular inlet opening and closing valve main body block 18 fixed airtight to the right side surface of the gas inlet-side block 12, the rectangular outlet opening and closing valve main body block 19 fixed airtight to the left side surface of the gas outlet-side block 13, the flow controller 3 fixed airtight to the back surface sides of the gas inlet-side block 12 and the gas outlet-side block 13 via the pressure type flow controller inlet block 15 and the pressure type flow controller outlet block 16 and having two piezoelectric element drive units 21 disposed in parallel, the inlet opening and closing valve 1 fixed to the back surface side of the inlet opening and closing valve main body block 18, the two outlet opening and closing valves 5 fixed in parallel to the back surface side of the outlet opening and closing valve main body block 19, etc. 21*a* denotes the control valve driven by the piezoelectric element drive unit 21.

Similarly, the second unit body $U_2$ is formed from the rectangular inlet opening and closing valve main body block 18 fixed airtight to the right side surface of the gas inlet-side block 12, the rectangular outlet opening and closing valve main body block 19 fixed airtight to the left side surface of the gas outlet-side block 13, the flow controller 3 fixed airtight to the front surface sides of the gas inlet-side block 12 and the gas outlet-side block 13 via the inlet block 15 and the outlet block 16 and having two piezoelectric element drive units 21 disposed in parallel, the inlet opening and closing valve 1 fixed to the front surface side of the inlet opening and closing valve main body block 18, the two outlet opening and closing valves 5 fixed in parallel to the front surface side of the outlet opening and closing valve main body block 19, etc., and the process gas inlet joint 6 and the purge gas inlet joint 7 are fixed to the right side surface of the inlet opening and closing valve main body block 18 while the process gas outlet joint 8 is fixed to the left side surface of the outlet opening and closing valve main body block 19.

The inlet opening and closing valve main body block 18 is a rectangular block body with a thickness of approximately 20 mm to 21 mm having attachment recessed parts 24 for the inlet opening and closing valves 1 provided at its front surface side and back surface side and the valve chambers of the inlet opening and closing valves 1 are formed therein. In the present embodiment, the inlet opening and closing valves 1 of a structure having a metal diaphragm as the valve body are used, and gas passages in communication with the process gas inlet joint 6 and the purge gas inlet joint 7 and the gas passage 28 in communication with the gas inlet-side block 12 are provided. Also, each of the inlet opening and closing valves 1 and outlet opening and closing valves 5 is fixed by an arrangement of screwing into the valve attachment recessed part 24.

The gas inlet-side block 12 is a rectangular column-shaped body with a height H of approximately 85 mm to 90 mm, has four vertical direction gas passages (penetrating holes) 25 bored in its height direction, and is provided with the horizontal direction gas passages 28 that are in communication with the four vertical direction gas passages (penetrating holes) 25. Inflow side gas passage portions having the horizontal direction gas passages 28 in communication with the four vertical direction gas passages (penetrating holes) 25 are provided at four stages at regular intervals in the height direction of the gas inlet-side block 12, and the gas passages 28 of each of these stages are respectively put in communication with the gas passages 28 of the inlet opening and closing valve main body blocks 18 of the respective unit bodies U.

The inlet block 15 is for coupling the flow controller main body block 14 of the flow controller 3 and the gas inlet-side block 12, and fixing the flow controller 3 to the gas inlet-side block 12 by means of the fixing bolts 20, and airtight fixing by the fixing bolts 20 is achieved by interposing sealing members 23.

Two gas passages 28 are provided in the inlet block 15. Also, "W Seal" made by Fujikin Incorporated is used as the sealing members 23, and further, UPG fittings (HEX 14) made by Fujikin Incorporated are used as the process gas inlet joint 6, the purge gas inlet joint 7, and the process gas outlet joint 8. However, it is obviously acceptable to use sealing members and joints besides these.

Each of the flow controllers 3 may be a thermal type flow controller or a pressure type flow controller, and pressure type flow controllers are used in the present embodiment.

Such pressure type flow controllers are publicly known by Japanese Published Unexamined Patent Application No. 2006-330851, etc., and use the known metal diaphragm-type piezoelectric element driven type control valve, disclosed in Japanese Published Unexamined Patent Application No. 2008-249002, etc., to adjust the pressure at the upstream side of an orifice to control the flow rate of the gas distributed through the orifice.

That is, the pressure type flow controller 3 is formed from the substantially rectangular flow controller main body block 14 provided with the gas passages 28 for two lines, the two valve attachment recessed parts 24 disposed in parallel in one side surface of the flow controller main body block 14, the piezoelectric element drive units 21 aligned in parallel and fixed to the respective valve attachment recessed parts 24, two control circuits 22, two pressure detector attachment recessed parts 26 disposed in parallel in the other side surface of the flow controller main body block 14, pressure detectors 4 respectively fixed inside the pressure detector attachment recessed parts 26, orifices 27 disposed at fluid outlet sides of the respective gas passages 28, a cover body 30, etc., and is characterized in being arranged as a thin structure provided with the pressure type flow controllers for two lines by integration of flow control units through organic combination of the two sets of piezoelectric element drive units 21 and control circuits 22.

Although in Example 1 described above, flow controllers using piezoelectric element driven type flow control valves made by Fujikin Incorporated are used as the pressure type flow controllers, pressure type flow controllers per se are publicly known and therefore detailed description thereof shall be omitted here. Also, 20 denotes the fixing bolts.

The outlet block 16 is for fixing the flow controller main body block 14 to the gas outlet-side block 13, and is formed to a rectangular block body, provided with two gas passages 28.

The gas outlet-side block 13 is a rectangular column-shaped body with the same height H of approximately 85 mm to 90 mm as the gas inlet-side block 12, and an outlet-side gas passage portion having a total of four gas passages 28 is formed therein for each single gas supplying unit U. The four gas passages 28 forming the outlet-side gas passage portion are bored with sets of two each differing in position in the height direction and the outlet-side gas passage portions, each having the four gas passages 28, are formed at four stages at intervals of approximately 20 mm to 21 mm in the height direction so as to correspond to the respective gas supplying units U.

The outlet opening and closing valve main body block 19 is a rectangular block body with the same thickness of approximately 20 mm to 21 mm as the inlet opening and closing valve main body block 18 and has the valve attachment recessed parts 24 for two outlet opening and closing valves 5 provided in parallel in each of the front surface side and back surface side thereof, with valve chambers of the outlet opening and closing valves 5 formed respectively therein. In the present embodiment, the outlet opening and closing valves 5 of a structure having a metal diaphragm as the valve body are used, and, in the outlet opening and closing valve main body block 19, the gas passages 28 are respectively provided to put in communication the outlet opening and closing valves 5 with each other, the outlet opening and closing valves 5 with the gas passages 28 of the gas outlet-side block 13, and the outlet opening and closing valves 5 with the process gas outlet joint 8.

The inlet opening and closing valve main body block 18, the gas inlet-side block 12, the inlet blocks 15, the flow controller main body blocks 14, the outlet blocks 16, the gas outlet-side block 13, and the outlet opening and closing valve main body block 19 that constitute the gas supplying unit U are fixed airtight to each other by the fixing bolts 20 (a portion of which is not shown) with the sealing members 23 and the orifices 27 being interposed. With the exception of the portions of the gas inlet-side block 12 and the gas outlet-side block 13, the gas supplying unit U is finished to a thickness of approximately 20 mm.

The gas supplying units U, each arranged from the first unit body $U_1$ and the second unit body $U_2$ and including four gas supply lines S, are stacked in four stages and fixed to each other as mentioned above. That is, the gas inlet-side block 12 and the gas outlet-side block 13 are formed to column-shaped bodies and therefore the four gas supplying units U are stacked and fixed in four stages by means of the gas inlet-side block 12 and the gas outlet-side block 13.

A gas that flows in from the process gas inlet joint 6 is diverted into four in the gas inlet-side block 12, passed through the respective gas passages 28 of the inlet blocks 15, the flow controller main body blocks 14, the outlet blocks 16, and the gas outlet-side block 13, merged in the outlet opening and closing valve main body block 19 and supplied to a process chamber from the process gas outlet joint 8.

Although in Example 1 shown in FIG. 4, the process gas inlet joint 6 is provided at one location, the number of inlet opening and closing valves 1 may be increased to increase the number of process gas inlet joints 6. Similarly, the gas passages 28 of the outlet opening and closing valve main body block 19 may be made independent passages, respectively, to increase the number of process gas outlet joints 8.

With Embodiment 1 described above, when the above-mentioned products of Fujikin Incorporated are used as the inlet opening and closing valves 1, the process gas inlet joint 6, the flow controllers 3, etc., and the inner diameter of the gas passages 28 of the respective portions is set to 6.27 mm, the total volume of the internal gas distribution passages (16 lines) of the integrated type gas supplying apparatus can be reduced to 53.4 cc, and, in addition, the structure at the gas outlet-side can be simplified.

Example 2

Figure 6:
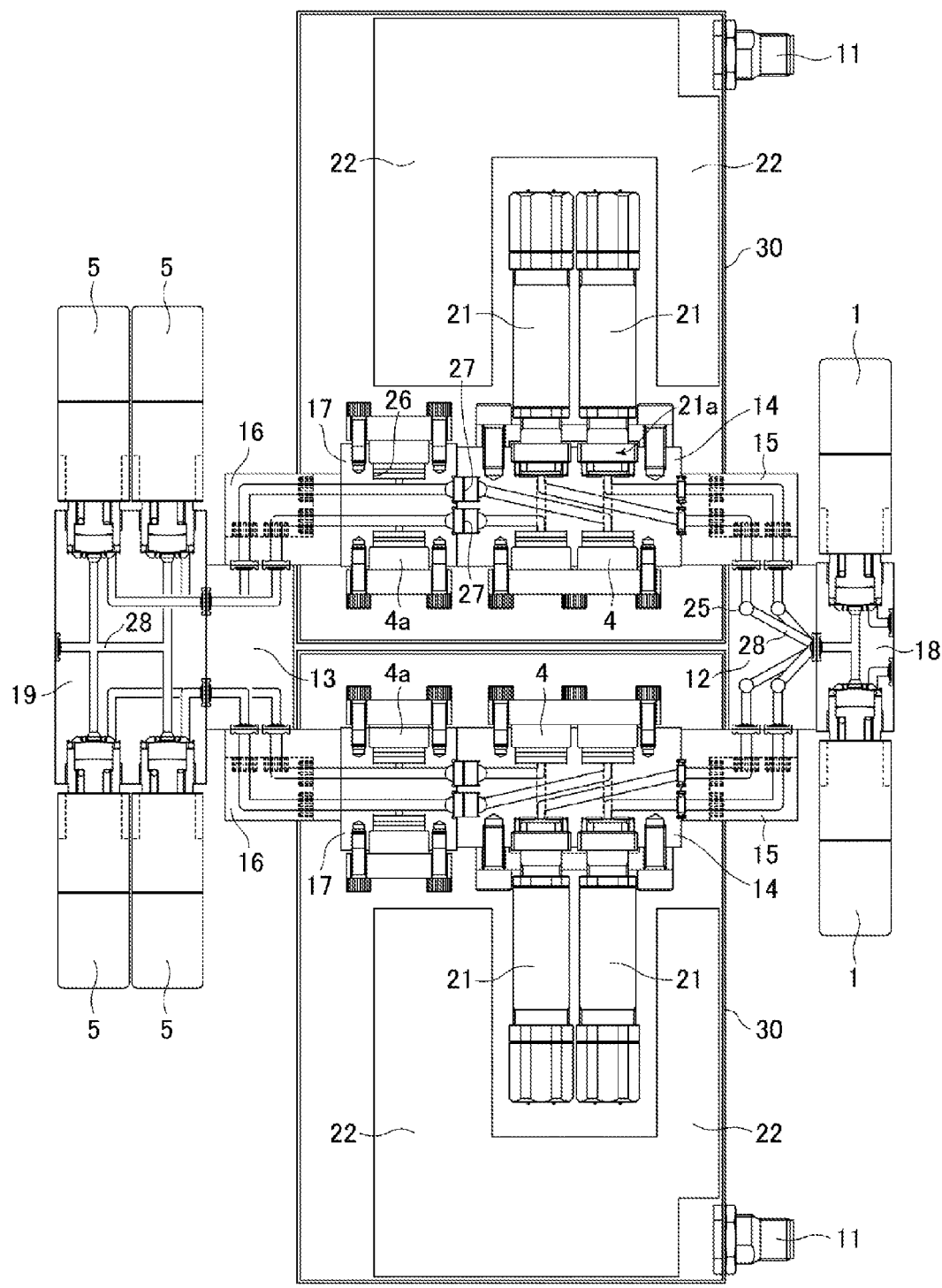
FIG. 6 is a cross sectional schematic drawing of a gas supplying unit according to Example 2 used in Embodiment 1 of the present invention.
Figure 7:
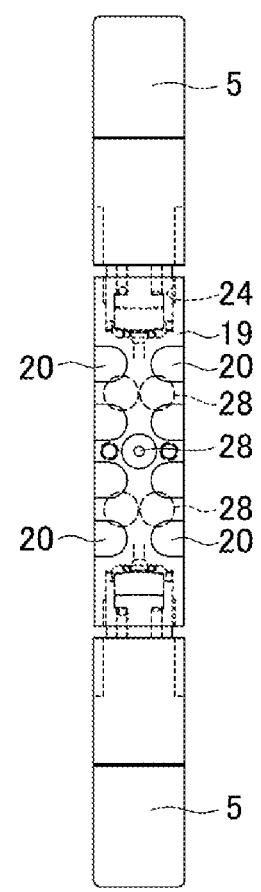
FIG. 7 is a left side view of a gas outlet portion in FIG. 6.

FIG. 6 shows Example 2 of the pressure type flow controller 3 used in Embodiment 1 of the present invention, and this differs from Example 1 just in the point that pressure detectors 4a are provided in addition to the pressure detectors 4. In FIG. 6, 17 denotes a pressure detector attachment block.

By providing the pressure detectors 4a, the pressures at the upstream sides and the downstream sides of the orifices 27 are detected to enable highly precise flow control even with a gas flow in a non-critical state.

The pressure detectors 4a related to Example 2 are publicly known per se and description thereof shall thus be omitted here.

Embodiment 2

FIG. 8 to FIG. 12 show Embodiment 2 of the present invention, and the arrangement of the integrated type gas supplying apparatus differs in the arrangements of the inlet-side gas flow passage portions of the gas inlet-side block 12 and the outlet-side gas flow passage portion of the outlet opening and closing valve main body block 19 and besides this point, the arrangements of other portions are exactly the same as those of Embodiment 1 described above.

Figure 8:
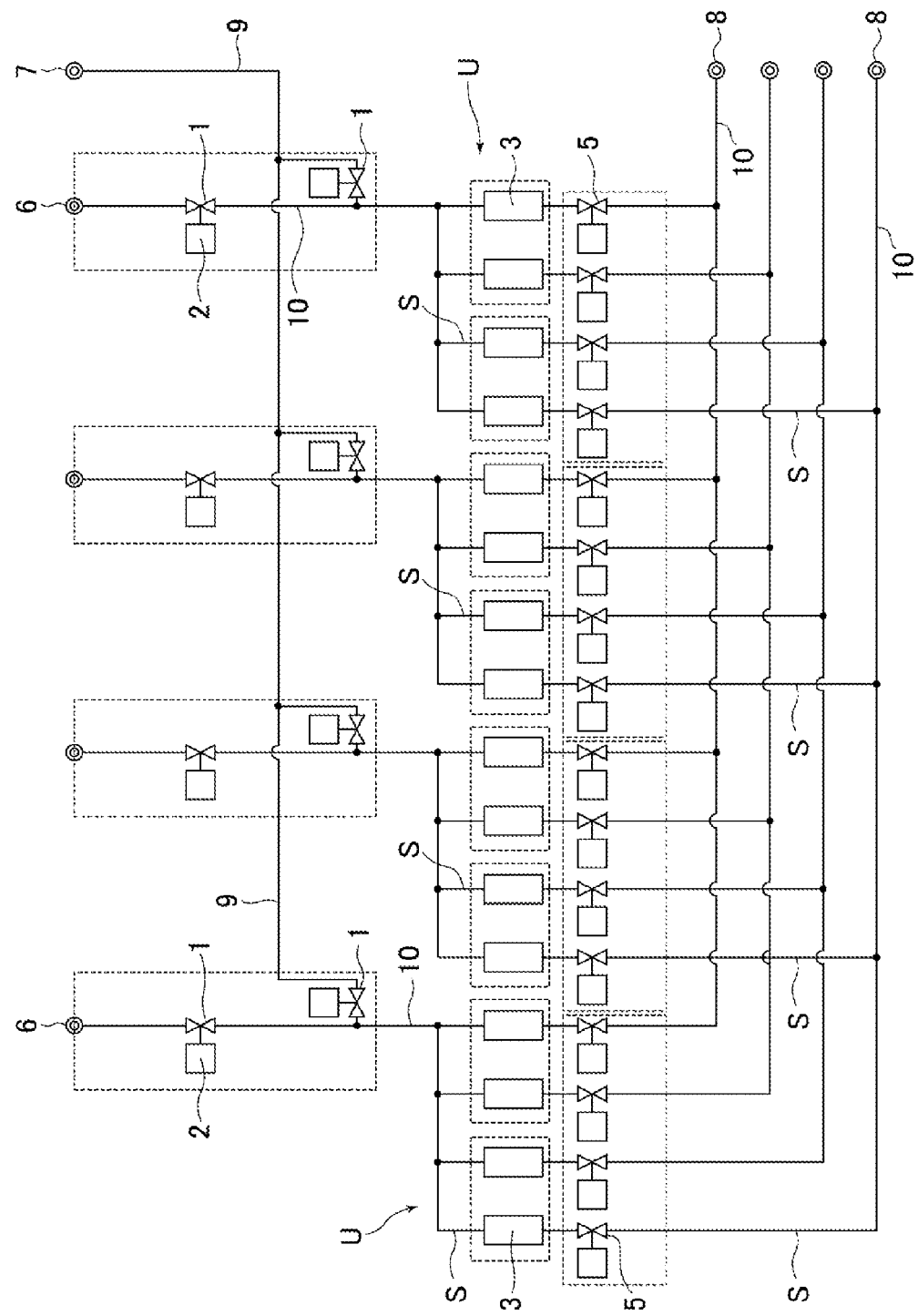
FIG. 8 is a gas supplying system diagram of an integrated type gas supplying apparatus for semiconductor manufacturing equipment according to Embodiment 2 of the present invention.
Figure 9:
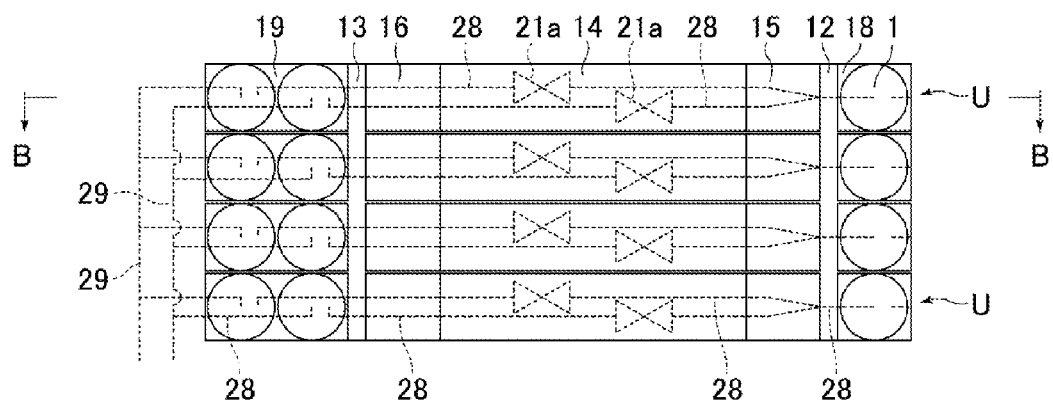
FIG. 9 is a front elevational view of the integrated type gas supplying apparatus for semiconductor manufacturing equipment according to Embodiment 2.
Figure 10:
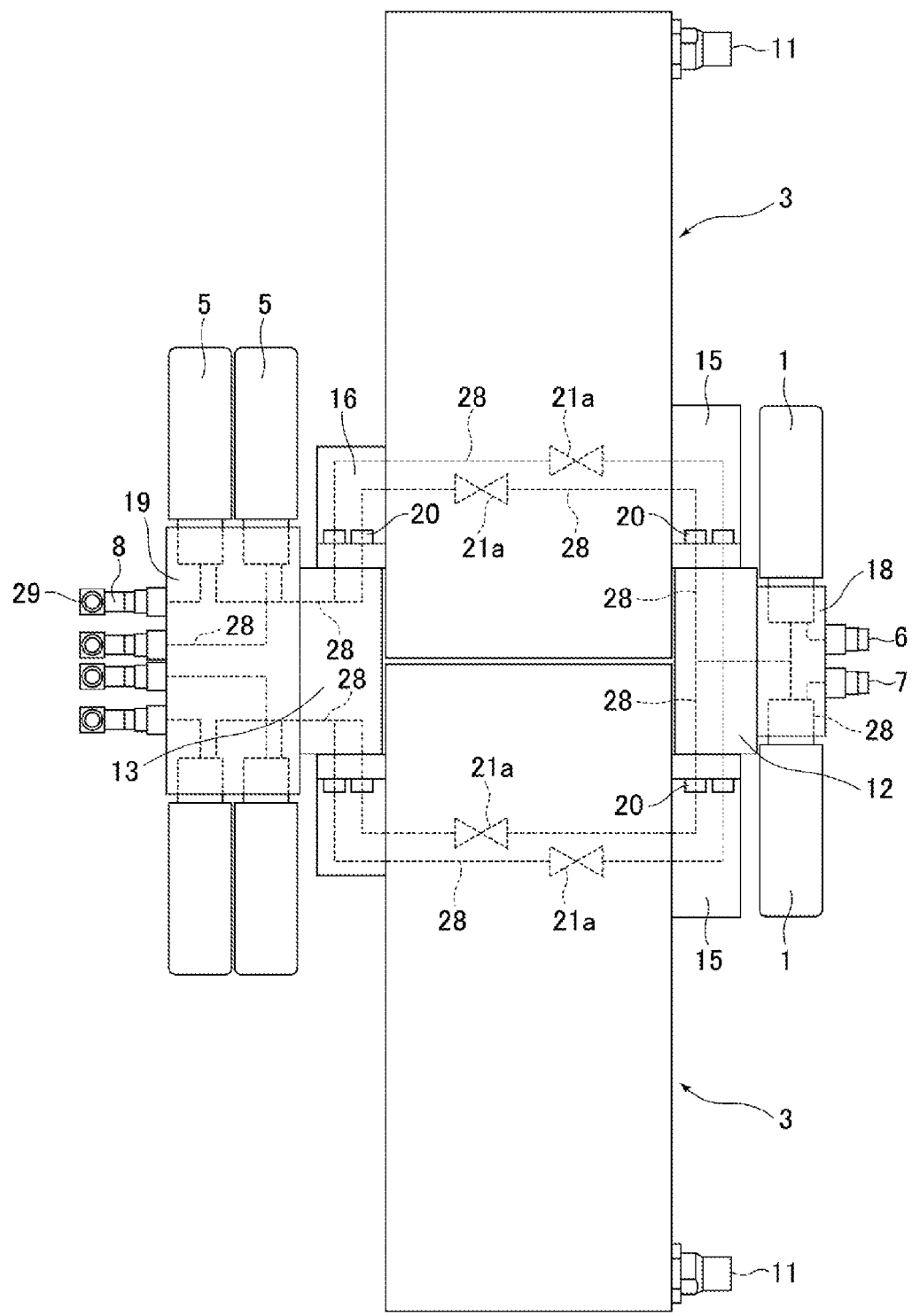
FIG. 10 is a cross sectional schematic drawing taken along a line B to B in FIG. 9.

That is, with Embodiment 2, a gas is introduced simultaneously to four gas supply lines S of a single gas supplying unit U from the process gas inlet joint 6 at one location, and the gas supply lines S that lead out from four gas supplying units U are merged in groups of four lines each that are then lead out from the respective process gas outlet joints 8, as shown in FIG. 8.

The arrangements of the gas inlet-side block 12 and the outlet opening and closing valve main body block 19 thus differ from those of Embodiment 1 as mentioned above, and the gas inlet-side block 12 of Embodiment 2 is arranged as a column-shaped body of height H with inlet-side gas passage portions having four mutually communicating gas passages 28 that supply the process gas or the purge gas to the four stacked gas supplying units U being formed therein at four stages at intervals in the height direction. By this arrangement, the process gas flowing in from each process gas inlet joint 6 is introduced respectively and uniformly into the four lines of flow controllers 3 of the corresponding gas supplying unit U as shown in FIG. 8.

Also, the outlet opening and closing valve main body block 19 of Embodiment 2 is provided with an outlet-side gas passage portion having four independent gas passages 28 that are respectively put in communication with the four outlet opening and closing valves 5, and the process gas outlet joint 8 is provided at each of the gas passages 28. The process gas outlet joints 8, each of one line of one of the four stacked gas supplying units U, are coupled to a coupling pipe 29 to lead out the gas from four process gas outlet joints 8. With this arrangement, a total of four gas supply lines S, each of which is led out from one gas supplying unit U, are merged and lead out through the process gas outlet joints 8 as shown in FIG. 8.

Embodiment 2 requires the coupling pipes 29 at the leading-out side of the gas and this impedes the downsizing of the apparatus. Therefore, the outlet opening and closing valve main body block 19 may be arranged as a columnar body of height H, four vertical direction gas passages (penetrating holes) 25 may be bored therein in the vertical direction, and outlet-side gas passage portions having four independent gas passages 28 of the four stacked gas supplying units U may be formed at intervals in the height direction in the outlet opening and closing valve main body block 19, and the respective process gas outlet joints 8 of the four stacked gas supplying units U may be coupled to each other by the vertical direction gas passages (penetrating holes) 25. In this case, the coupling pipe 29 is made unnecessary and the apparatus can be simplified more.

With the integrated type gas supplying apparatus according to Embodiment 2, in the case where the conditions, such as the gas passage inner diameter, etc., are the same as those of Embodiment 1, the total volume of the internal gas distribution passages (16 lines) can be reduced to 63.8 cc and, in addition, the structure at the gas inlet side can be simplified.

Embodiment 3

Figure 13:
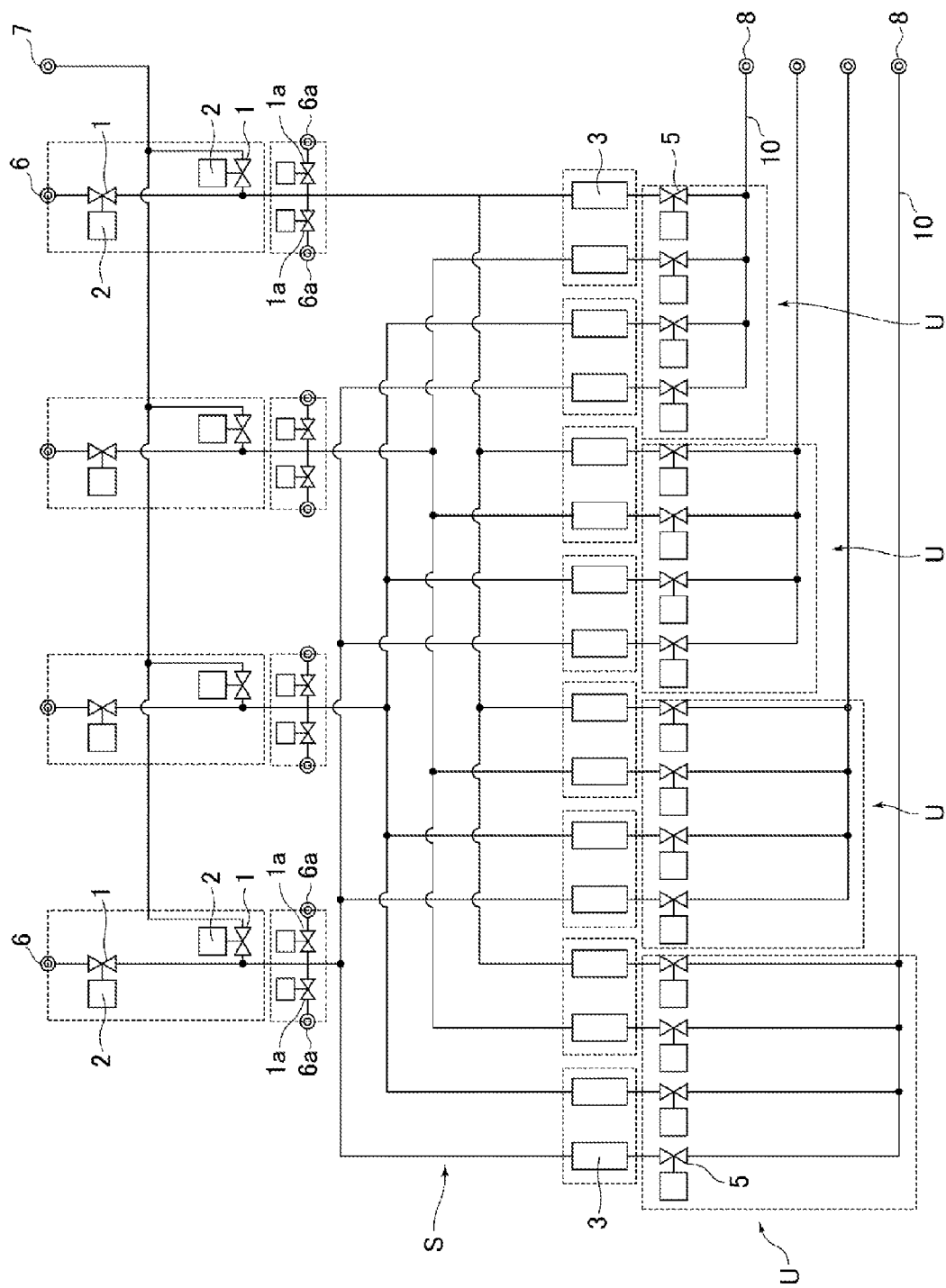
FIG. 13 is a gas supplying system diagram of an integrated type gas supplying apparatus for semiconductor manufacturing equipment according to Embodiment 3.
Figure 14:
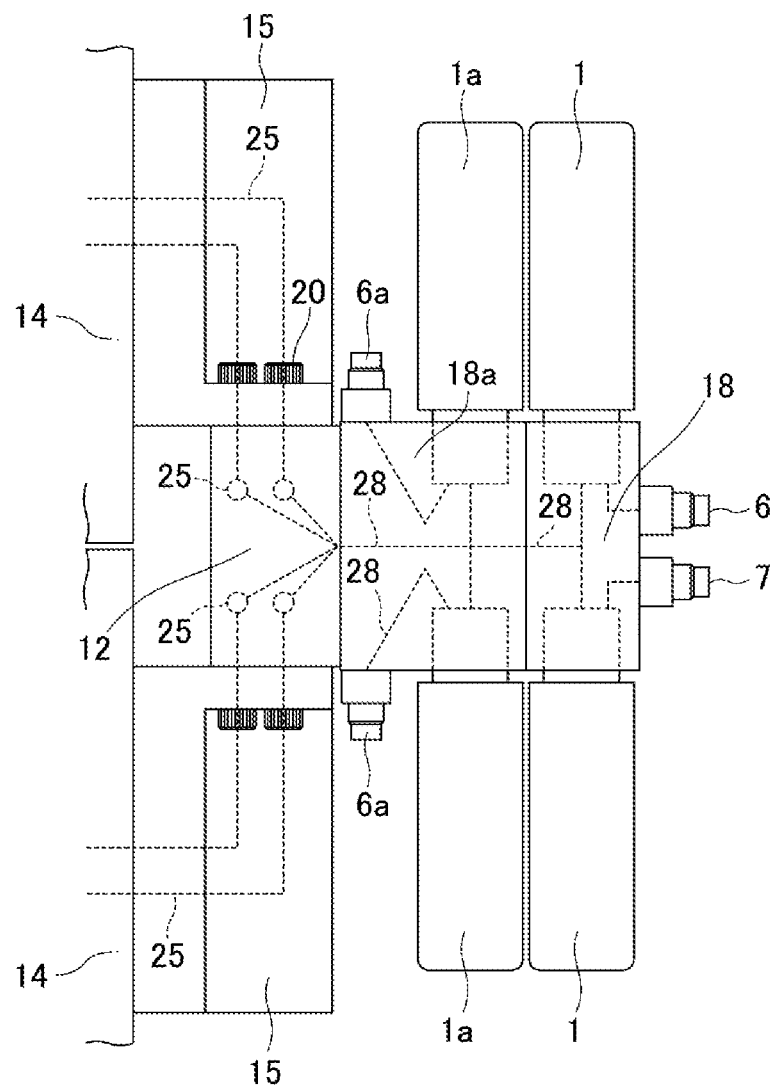
FIG. 14 is a cross sectional schematic drawing of a gas inlet portion of a gas supplying unit U according to Embodiment 3.
Figure 15:
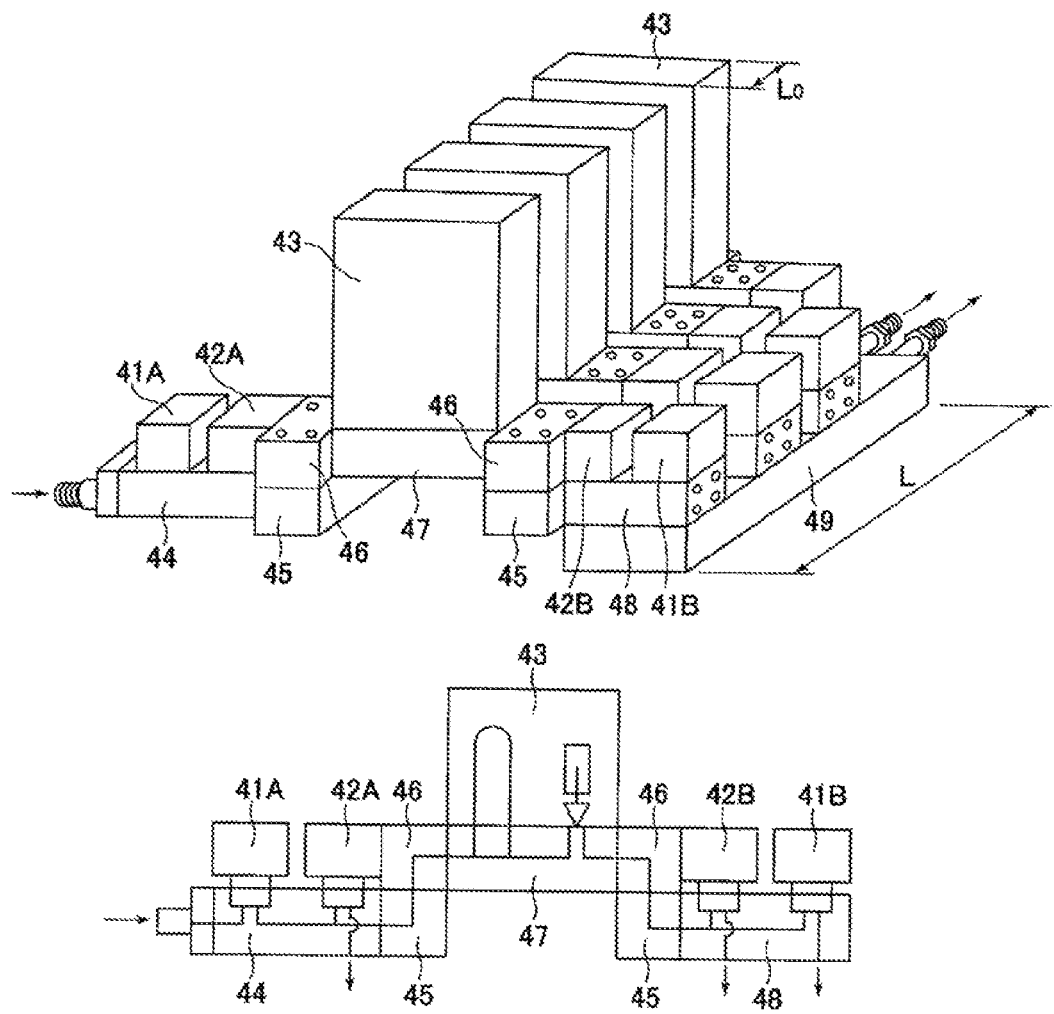
FIG. 15 is a perspective view of one example of a conventional integrated type gas supplying apparatus (Japanese Published Unexamined Patent Application No. Hei 5-172265).

FIG. 13 and FIG. 14 show Embodiment 3, which has an arrangement where gas supply ports are separately provided at the downstream sides of the inlet opening and closing valves 1 in the gas supplying unit U of Embodiment 1.

That is, Embodiment 3 has an arrangement where an inlet opening and closing valve main body block 18a is interposed between the gas inlet-side block 12 and the inlet opening and closing valve main body block 18, and inlet opening and closing valves 1a and process gas inlet joints 6a are fixed to the back surface side and the front surface side of the inlet opening and closing valve main body block 18a to increase the number of process gas supplying locations, and the arrangements besides the inlet opening and closing valves 1a and the process gas inlet joints 6a are the same as those of Embodiment 1.

By this arrangement, the number of supplying locations for process gas, etc., can be increased easily without significantly increasing the internal volume of the gas distribution passages in the interior of the apparatus.

Although each of the embodiments described above has an arrangement where four gas supplying units U are stacked, the number of stacked gas supplying units U may obviously be two units, three units, or four units or more.

Also, although each of the embodiments described above has an arrangement where a single gas supplying unit U, having four gas supply lines S, is formed by making the first unit body $U_1$ and the second unit body $U_2$, each having two gas supply lines S, oppose each other horizontally and fixing these, obviously each of the first unit body $U_1$ and the second unit body $U_2$ may have one gas supply line S or no less than two gas supply lines S and the gas supplying unit U may have two, three, or no less than four gas supply lines S.

INDUSTRIAL APPLICABILITY

The present invention is applicable not only to an integrated type gas supplying apparatus for semiconductor manufacturing equipment but also to an integrated type gas supplying apparatus for various types of chemical equipment, etc.

DESCRIPTION OF REFERENCE SYMBOLS

W: width dimension of integrated type gas supplying apparatus
L: depth dimension of integrated type gas supplying apparatus
H: height dimension of integrated type gas supplying apparatus
S: gas supply line U: gas supplying unit
U₁: first gas supplying unit
U₂: second gas supplying unit
1: inlet opening and closing valve
1a: inlet opening and closing valve
2: valve driving unit
3: flow controller (pressure type flow controller)
4: pressure detector
4a: pressure detector
5: outlet opening and closing valve
6: process gas inlet joint
6a: process gas inlet joint
7: purge gas inlet joint
8: process gas outlet joint
9: purge gas passage
10: process gas passage
11: input/output connecting tool (cable connector)
12: gas inlet-side block
13: gas outlet-side block
14: flow controller main body block
15: inlet block
16: outlet block
17: pressure detector attachment block
18: inlet opening and closing valve main body block
18a: inlet opening and closing valve main body block
19: outlet opening and closing valve main body block
20: fixing bolt
21: piezoelectric element drive unit
21a: control valve
22: control circuit
23: sealing member
24: valve attachment recessed part
25: vertical direction gas flow passage
26: pressure detector attachment recessed part
27: orifice
28: gas passage
29: coupling pipe
30: cover body

The invention claimed is:

1. An integrated type gas supplying apparatus, comprising:
a plurality of stacked and fixed gas supplying units, each gas supplying unit having at least four gas supply lines, each gas supplying unit formed by opposingly combining and fixing two flow controllers, each flow controller provided with a plurality of flow control units, to a gas inlet-side block and a gas outlet-side block,
wherein the gas inlet-side block and the gas outlet-side block are disposed in parallel across an interval in plan view,
wherein each flow controller is provided with a first inlet opening and closing valve and first outlet opening and closing valve,
wherein an inlet opening and closing valve main body block is fixed to a right side surface of the gas inlet-side block, the inlet opening and closing valves of the respective flow controllers are fixed to a front surface side and a back surface side of the inlet opening and closing valve main body block, an outlet opening and closing valve main body block is fixed to a left side surface of the gas outlet-side block, and the outlet opening and closing valves of the respective flow controllers are fixed to a front surface side and a back surface side of the outlet opening and closing valve main body block.

2. An integrated type gas supplying apparatus according to claim 1, wherein each flow controller is a pressure type flow controller having two flow control units disposed in parallel,
wherein the respective flow controllers are opposingly combined and fixed by fixing an inlet block of each flow controller to a side surface of the gas inlet-side block, and fixing an outlet block of each flow controller to a side surface of the gas outlet-side block.

3. An integrated type gas supplying apparatus according to claim 2, wherein the integrated type gas supplying apparatus comprises four stacked and fixed gas supplying units.

4. An integrated type gas supplying apparatus according to claim 2, wherein for each flow controller, one inlet opening and closing valve is disposed at the inlet opening and closing valve main body block, a process gas or a purge gas from a single process gas inlet joint or purge gas inlet joint is supplied to the first inlet opening and closing valves of the respective flow controllers, and the process gas or the purge gas is supplied to the respective flow controllers through gas passages of the gas inlet-side block and gas passages of the inlet blocks of the flow controller.

5. An integrated type gas supplying apparatus according to claim 2, wherein for each flow controller, two outlet opening and closing valves are disposed at the outlet opening and closing valve main body block and the process gas or purge gas from the total of four outlet opening and closing valves is supplied through a single process gas outlet joint.

6. An integrated type gas supplying apparatus according to claim 2, wherein the gas inlet-side block is arranged as a column-shaped body of height H with a plurality of gas passages provided therein in a vertical direction, and inlet-side gas passage portions having four gas passages in the gas inlet-side block that respectively correspond to stacked gas supplying units are put in mutual communication via vertical direction gas passages.

7. An integrated type gas supplying apparatus according to claim 6, wherein there are four stacked and fixed gas supplying units.

8. An integrated type gas supplying apparatus according to claim 2, wherein the gas outlet-side block is arranged as a column-shaped body of height H with outlet-side gas passage portions having four gas passages of the plurality of stacked gas supplying units formed therein at intervals in the height direction.

9. An integrated type gas supplying apparatus according to claim 8, wherein there are four stacked and fixed gas supplying units.

10. An integrated type gas supplying apparatus according to claim 2, wherein the gas inlet-side block is arranged as a column-shaped body of height H with inlet-side gas passage portions having four gas passages arranged to supply the process gas or purge gas to the plurality of stacked gas supplying units formed therein at intervals in the height direction.

11. An integrated type gas supplying apparatus according to claim 10, wherein there are four stacked gas and fixed supplying units.

12. An integrated type gas supplying apparatus according to claim 2, wherein the outlet opening and closing valve main body block is provided with an outlet-side gas passage portion having four independent gas passages respectively in communication with four outlet opening and closing valves, each of the gas passages being provided with a process gas outlet joint, wherein the respective process gas outlet joints of the plurality of stacked gas supplying units are coupled to each other by a coupling pipe.

13. An integrated type gas supplying apparatus according to claim 12, wherein there are four stacked gas and fixed supplying units.

14. An integrated type gas supplying apparatus according to claim 12, wherein the outlet opening and closing valve main body block is arranged as a column-shaped body of height H with a plurality of vertical direction gas passages bored therein, outlet-side gas passage portions having four independent gas passages of the plurality of stacked gas supplying units are formed at intervals in the height direction in the outlet opening and closing valve main body block, and the gas passages of the respective outlet-side gas passage portions of the plurality of stacked gas supplying units are put in mutual communication by the vertical direction gas passages.

15. An integrated type gas supplying apparatus according to claim 14, wherein there are four stacked gas and fixed supplying units.

16. An integrated type gas supplying apparatus according to claim 2, wherein an inlet opening and closing valve main body intermediate block is interposed between the gas inlet-side block and the inlet opening and closing valve main body block, and a second inlet opening and closing valve and a process gas inlet joint are fixed to a back surface side and a front surface side of the inlet opening and closing valve main body intermediate block, thereby increasing the number of locations for supplying the process gas.

17. An integrated type gas supplying apparatus according to claim 16, wherein there are four stacked gas and fixed supplying units.

18. An integrated type gas supplying apparatus according to claim 1, wherein, for each flow controller, one inlet opening and closing valve is disposed at the inlet opening and closing valve main body block, a process gas or a purge gas from a single process gas inlet joint or purge gas inlet joint is supplied to the first inlet opening and closing valves of the respective flow controllers, and the process gas or the purge gas is supplied to the respective flow controllers through gas passages of the gas inlet-side block and gas passages of the inlet blocks of the flow controller.

19. An integrated type gas supplying apparatus according to claim 1, wherein, for each flow controller, two outlet opening and closing valves are disposed at the outlet opening and closing valve main body block and the process gas or purge gas from the total of four outlet opening and closing valves is supplied through a single process gas outlet joint.

20. An integrated type gas supplying apparatus according to claim 1, wherein the gas inlet-side block is arranged as a column-shaped body of height H with a plurality of gas passages provided therein in a vertical direction, and inlet-side gas passage portions having four gas passages in the gas inlet-side block that respectively correspond to stacked gas supplying units are put in mutual communication via vertical direction gas passages.

21. An integrated type gas supplying apparatus according to claim 20, wherein there are four stacked and fixed gas supplying units.

22. An integrated type gas supplying apparatus according to claim 1, wherein the gas outlet-side block is arranged as a column-shaped body of height H with outlet-side gas passage portions having four gas passages of the plurality of stacked gas supplying units formed therein at intervals in the height direction.

23. An integrated type gas supplying apparatus according to claim 22, wherein there are four stacked and fixed gas supplying units.

24. An integrated type gas supplying apparatus according to claim 1, wherein the gas inlet-side block is arranged as a column-shaped body of height H with inlet-side gas passage portions having four gas passages arranged to supply the process gas or purge gas to the plurality of stacked gas supplying units formed therein at intervals in the height direction.

25. An integrated type gas supplying apparatus according to claim 24, wherein there are four stacked and fixed gas supplying units.

26. An integrated type gas supplying apparatus according to claim 1, wherein the outlet opening and closing valve main body block is provided with an outlet-side gas passage portion having four independent gas passages respectively in communication with four outlet opening and closing valves, each of the gas passages being provided with a process gas outlet joint,
wherein the respective process gas outlet joints of the plurality of stacked gas supplying units are coupled to each other by a coupling pipe.

27. An integrated type gas supplying apparatus according to claim 26, wherein there are four stacked and fixed gas supplying units.

28. An integrated type gas supplying apparatus according to claim 26, wherein the outlet opening and closing valve main body block is arranged as a column-shaped body of height H with a plurality of vertical direction gas passages bored therein, outlet-side gas passage portions having four independent gas passages of the plurality of stacked gas supplying units are formed at intervals in the height direction in the outlet opening and closing valve main body block, and the gas passages of the respective outlet-side gas passage portions of the plurality of stacked gas supplying units are put in mutual communication by the vertical direction gas passages.

29. An integrated type gas supplying apparatus according to claim 28, wherein there are four stacked and fixed gas supplying units.

30. An integrated type gas supplying apparatus according to claim 1, wherein an inlet opening and closing valve main body intermediate block is interposed between the gas inlet-side block and the inlet opening and closing valve main body block, and a second inlet opening and closing valve and a process gas inlet joint are fixed to a back surface side and a front surface side of the inlet opening and closing valve main body intermediate block, thereby increasing the number of locations for supplying the process gas.

* * * * *